United States Patent
Liu et al.

(10) Patent No.: US 10,225,751 B1
(45) Date of Patent: Mar. 5, 2019

(54) SYSTEMS AND METHODS FOR HYBRID CONTROL OF COMPUTER NETWORKS

(71) Applicant: Google Inc., Mountain View, CA (US)

(72) Inventors: Junda Liu, Mountain View, CA (US); Jiangbo Li, Sunnyvale, CA (US); Victor Lin, Fremont, CA (US)

(73) Assignee: Google LLC, Mountain View, CA (US)

(*) Notice: Subject to any disclaimer, the term of this patent is extended or adjusted under 35 U.S.C. 154(b) by 160 days.

(21) Appl. No.: 15/353,159

(22) Filed: Nov. 16, 2016

(51) Int. Cl.
*H04L 12/26* (2006.01)
*H04W 24/04* (2009.01)
*H04L 12/703* (2013.01)
*H04W 24/08* (2009.01)

(52) U.S. Cl.
CPC .......... *H04W 24/04* (2013.01); *H04L 43/0811* (2013.01); *H04L 45/28* (2013.01); *H04W 24/08* (2013.01)

(58) Field of Classification Search
CPC ........ H04W 24/04; H04W 24/08; H04L 45/28
See application file for complete search history.

(56) References Cited

U.S. PATENT DOCUMENTS

| | | |
|---|---|---|
| 8,489,765 B2 | 7/2013 | Vasseur et al. |
| 2011/0228696 A1 | 9/2011 | Agarwal et al. |
| 2013/0028142 A1* | 1/2013 | Beheshti-Zavareh ............... H04L 45/22 370/255 |
| 2013/0219046 A1 | 8/2013 | Wetterwald et al. |
| 2013/0223218 A1 | 8/2013 | Vasseur et al. |
| 2014/0325038 A1* | 10/2014 | Kis .................... H04L 41/0803 709/220 |

OTHER PUBLICATIONS

Devi, K.V. Uma Karuna, et al. Optimizing the Network Failures by Self-Determining Acyclic Digraph, International Journal of Computer Science and Technology, Apr.-Jun. 2013, vol. 4, Issue 2, pp. 693-696.
Garcia-Lunes-Aceves, J. J. Loop-Free Routing Using Diffusing Computations, IEEE/ACM Transactions on Networking, Feb. 1993, vol. 1, No. 1, pp. 130-141.
Liu, Junda. Routing Along DAGs, Technical Report No. UCB/EECS-2011-155, PhD Dissertation, Electrical Engineering and Computer Sciences, University of California at Berkeley, Dec. 18, 2011, 92 pages. Retrieved from: http://www.eecs.berkeley.edu/Pubs/TechRpts/2011/EECS-2011-155.html.

* cited by examiner

*Primary Examiner* — Kent K Krueger
(74) *Attorney, Agent, or Firm* — McDermott Will & Emery LLP

(57) ABSTRACT

Systems and methods of hybrid control of a computer network are provided. The system can comprise a controller and a plurality of nodes having an in-band control plane network arranged in a directed acyclic graph routing topology. A first node of the plurality of nodes can be configured to detect a link failure of a first link, the first link being controller-directed. The first node can reverse a second link to a second node from outward-directed to controller-directed such that the first node can communicate with the controller via the second link and the in-band control plane network. The first node can detect a reversal of the second link caused by the second node. The first node can determine that the in-band control plane network is partitioned. The first node can use an out-of-band control plane network to inform the controller that the in-band control plane network is partitioned.

20 Claims, 9 Drawing Sheets

SYSTEMS AND METHODS FOR HYBRID CONTROL OF COMPUTER NETWORKS

BACKGROUND

Large-scale networks traditionally operated according to distributed routing protocols. More recently, software-defined networking protocols have evolved to allow for centralized control of network elements. Network elements transfer user data via a data plane network. Controllers in a software-defined network (SDN) can communicate network control information to network elements via a control plane network (CPN). A CPN using the same physical links as the data plane network can be referred to as an in-band CPN. A CPN using dedicated physical links separate from the data plane physical links can be referred to as an out-of-band CPN.

SUMMARY

At least one aspect is directed to a system for hybrid control of computer networks. The system can include a first node of a plurality of nodes having an in-band control plane network arranged in a directed acyclic graph routing topology, the first node having a first link that is controller-directed such that the first node can communicate with a controller via the in-band control plane network. The first node can be configured to detect a link failure of the first link of the first node, the first link being controller-directed. The first node can be configured to reverse, in response to detecting the link failure of the first link, a second link to a second node from outward-directed to controller-directed such that the first node can communicate with the controller via the second link and the in-band control plane network. The first node can be configured to detect a reversal by the second node of the second link. The first node can be configured to determine, responsive to detecting a predetermined number of reversals of the second link without receiving a communication from the controller, that the in-band control plane network is partitioned. The first node can be configured to transmit, to the controller via an out-of-band control plane network, data indicating that the in-band control plane network is partitioned.

In some implementations, the out-of-band control plane network comprises a wireless network. In some implementations, the predetermined number of reversals equals a maximum allowed level value. In some implementations, determining that the in-band control plane network is partitioned comprises determining that the first node has no remaining controller-directed links or that all possible controller-directed links of the first node have been reversed.

In some implementations, the first node has a third outward-directed link to a third node and a fourth outward-directed link to a fourth node. In such implementations, the first node is further configured to receive, from the controller via the first link, a control packet; duplicate the control packet; transmit the duplicated control packets to the third node via the third outward-directed link and to the fourth node via the fourth outward-directed link, respectively.

In some implementations, the system further comprises a fifth node receiving the duplicated control packets from the third node and the fourth node, respectively. In such implementations, the fifth node deduplicates the duplicated control packets, and transmits the deduplicated control packet via a fifth outward-directed link to a sixth node.

In some implementations, the system comprises a plurality of controllers, wherein the directed acyclic graph routing topology includes a virtual root having a virtual outward-directed link to each of the plurality of controllers.

In some implementations, the computer network comprises a plurality of hosts having addresses in a first address space, and the nodes have addresses in a second address space separate from the first address space.

At least one aspect is directed to a method of hybrid control of computer networks. The method can pertain to a computer network having a first node of a plurality of nodes having an in-band control plane network arranged in a directed acyclic graph routing topology, the first node having a first link that is controller-directed such that the first node can communicate with a controller via the in-band control plane network. The method can include detecting, by the first node of the plurality of nodes, a link failure of the first link of the first node, the first link being controller-directed. The method can include reversing, by the first node in response to detecting the link failure of the first link, a second link to a second node from outward-directed to controller-directed such that the first node can communicate with the controller via the second link and the in-band control plane network. The method can include detecting, by the first node, a reversal by the second node of the second link. The method can include determining, responsive to detecting a predetermined number of reversals of the second link without receiving a communication from the controller, that the in-band control plane network is partitioned. The method can include transmitting, by the first node to the controller via an out-of-band control plane network, data indicating that the in-band control plane network is partitioned.

At least one aspect is directed to non-transitory, computer-readable medium storing instructions. The instructions can, when executed by one or more processors of a first node of a plurality of nodes having an in-band control plane network arranged in a directed acyclic graph routing topology, the first node having a first link that is controller-directed such that the first node can communicate with a controller via the in-band control plane network, cause the node to detect a link failure of the first link of the first node, the first link being controller-directed. The instructions can cause the node to reverse, in response to detecting the link failure of the first link, a second link to a second node from outward-directed to controller-directed such that the first node can communicate with the controller via the second link and the in-band control plane network. The instructions can cause the node to detect a reversal by the second node of the second link. The instructions can cause the node to determine, responsive to detecting a predetermined number of reversals of the second link without receiving a communication from the controller, that the in-band control plane network is partitioned. The instructions can cause the node to transmit, to the controller via an out-of-band control plane network, data indicating that the in-band control plane network is partitioned.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
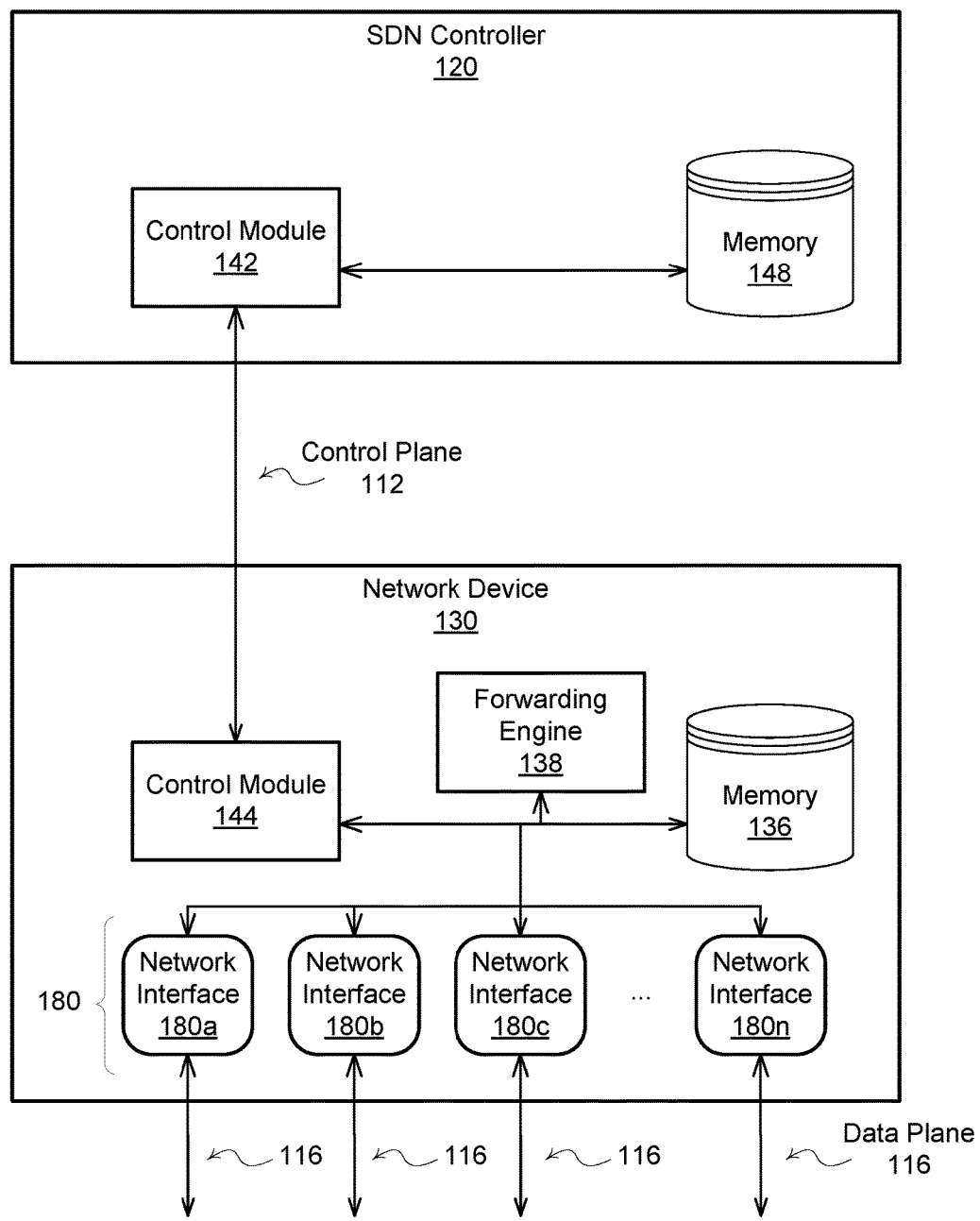
FIG. 1 is a block diagram of a software-defined networking controller and a network device, according to an illustrative implementation.

Systems and methods of this disclosure relate generally to hybrid control of computer networks. Large dynamic networks can be difficult to manage. Legacy networking protocols are inherently distributed, leading to subpar network utilization and slow failure recovery. Newer software-defined networking (SDN) systems allow for centralized control of packet forwarding rules and fast iteration of network software; however, SDNs present new challenges in maintaining a control plane network for facilitating communication between the controllers and network devices.

The control plane network can exist either on the same physical network as data transmission, or as a physically separate network. A physically separate, or "out-of-band," control plane network can require a significant investment in additional equipment, yet can lack redundancy and capacity. Alternatively, an "in-band" control plane network existing on the same network as data transmission can yield better performance at lower cost relative to an out-of-band control plane network. But despite the advantages of in-band control plane networks, adoption has been slow due to concerns regarding complexity and adequate isolation between control and data traffic.

This disclosure therefore provides systems and methods for hybrid control of computer networks. In the hybrid system, centralized control is accomplished primarily via an in-band control plane network, with an out-of-band control plane network available as a backup in the event of failure of the in-band control plane network. By relying primarily on the in-band control plane network, fewer resources are needed to build and maintain the out-of-band control plane network.

The system can employ an algorithm for arranging an in-band control plane network among the controllers and network devices of the computer network. The network devices of the network can perform the algorithm independently, and do not require the controller. The network devices can arrange a control plane network topology among themselves according to a directed acyclic graph. In doing so, each network device can determine a shortest path to the controller; that is, a path having a minimum number of hops to the controller. The network devices can arrange themselves into levels, with Level 1 including network devices one hop from the controller, Level 2 including the next hop network devices, and so on. With the control plane network topology arranged according to the directed acyclic graph, the controller can send a control packet outward to each network device. The controller can send a control packet to each network device in Level 1. Each network device in Level 1 can forward the packet to each Level 2 network device to which it is connected. A network device in Level 2 may receive duplicate packets from different Level 1 network devices. In that case, each Level 2 network device can de-duplicate the packet before forwarding it to the Level 3 network devices, and so on. This duplication can improve resilience of the control plane communications.

The algorithm can arrange for self-healing of the control plane network in the event of a link failure. A network device in the control plane network can respond to an controller-directed link failure by reversing one or more outward-directed links. The reversals may propagate through the network until a new directed acyclic graph is arranged. The scope of reversals can be limited to only the network devices that lost connection to the controller; others need not be affected. The fundamental improvement of this self-healing property is that the network devices do not require central control of, or global consensus for, the reconfiguration. Rather, it is sufficient to have agreement between neighboring network devices regarding the assignment of the link direction.

In the event of a network partition, in which a network device is left with no link to the controller via the in-band control plane network, the system can fall back to an out-of-band control plane network. In the event of a partition, link reversals will tend to reverse infinitely in vain. Thus, a network device can consider the network partitioned when it detects a threshold number of link reversals. A network device detecting a partition can notify the controller of the partition via the out-of-band control plane network. The controller, upon receiving notification of the partition, can adjust network topology as necessary to restore the graph, if possible.

FIG. 1 is a block diagram of a software-defined networking (SDN) controller 120 and a network device 130, according to an illustrative implementation. The SDN controller 120 and the network device 130 can be connected by a control plane link 112. In broad overview, the SDN controller 120 includes a control module 142 and memory 148; e.g., for storing network configuration and routing data. The network device 130 includes a control module 144 and memory 136, e.g., for storing device configuration and routing data. The network device 130 includes a forwarding engine 138 that uses the device configuration and routing data stored in memory 136 to manage data traffic at network interfaces 180. The network device 130 can be any type of switch, router, or modem used to transfer data in a network.

Referring to FIG. 1, in more detail, the SDN controller 120 includes a control module 142 and memory 148. The control module 142 uses network configuration and routing data stored in the memory 148 to configure the network device 130. In some implementations, the control module 142 periodically sends a status or availability message to the network device 130. In some implementations, the SDN controller 120 includes additional application modules, not shown.

The network device 130 includes a control module 144 and memory 136. The network device control module 144 receives configuration and routing information from the SDN controller control module 142 (via the control plane 112) and updates the data stored in memory 136. The configuration and routing information can include, for example, forwarding table entries, multipath route weights, or protocol selections.

The network device 130 includes a set of network interfaces 180. Each network interface 180 may be connected to a physical link that forms a part of a data plane 116. External devices can send data packets to the network device 130, via the data plane 116 and a first network interface (e.g., network interface 180a). The network device 130 can forward data packets to an appropriate next-hop via another interface (e.g., network interface 180b). In some implementations, the forwarding engine 138 determines which network interface 180 to use for forwarding each data packet received.

The forwarding engine 138 uses configuration and routing data in memory 136 to manage the data traffic at the network interfaces 180. The configuration and routing data in memory 136 are controlled by the SDN controller 120 via the control module 144. In some implementations, the forwarding engine 138 can update packet headers before forwarding packets to an egress network interface 180. For example, the forwarding engine 138 may update ECN, TTL, or checksum information in packet headers.

The memory 136 and the memory 148 may each be any device suitable for storing computer readable data. Examples include, but are not limited to, semiconductor memory devices such as EPROM, EEPROM, SRAM, and flash memory devices. In some implementations, the memory 136 of a network device 130 includes memory dedicated to buffering packet flows as they traverse the network device 130. A network device 130 may have any number of memory devices 136. An SDN controller 120 may have any number of memory devices 148.

Figure 2:
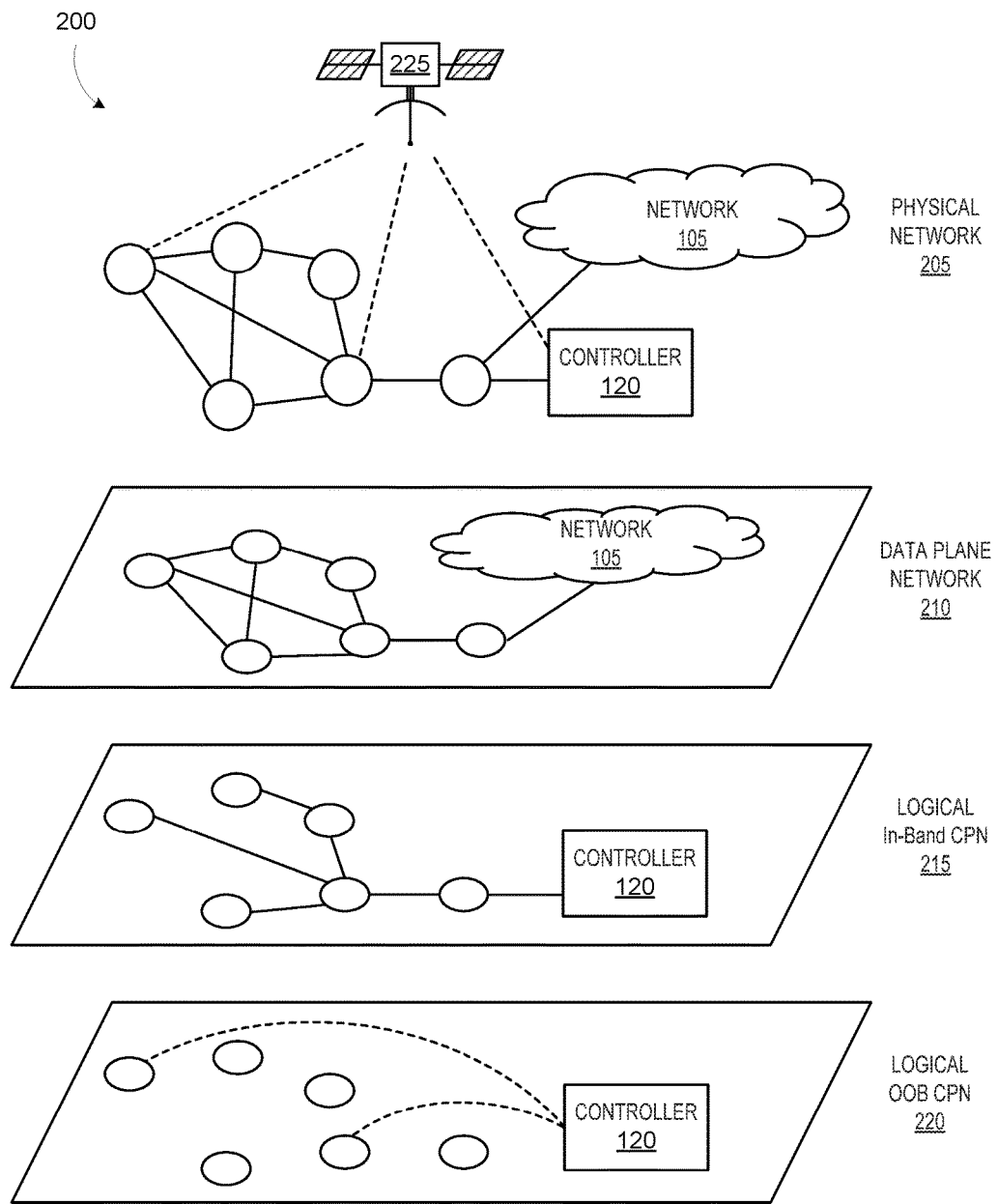
FIG. 2 illustrates various aspects of an example network, according to an illustrative implementation.

FIG. 2 illustrates various aspects of an example network 200, according to an illustrative implementation. The network 200 can have several different aspects including, without limitation, a physical network 205, a data plane network 210, a logical in-band control plane network (CPN) 215, and a logical out-of-band (OOB) CPN 220.

The physical network 205 can represent the physical links of the network such as wired, wireless, and optical links. The physical network 205 can be a local-area network (LAN), a wide-area network (WAN), an access network, a transit network, or private network. In some implementations, the physical network 205 can include a data center, a portion of a data center, or a group of data centers. In some implementations, the physical network 205 can be a switching network at, for example, an internet service provider (ISP). The physical network 205 can include a plurality of network device, or nodes, represented as circles. The network devices can be, for example, network devices such as the network device 130 described with respect to FIG. 1. The physical network 205 can include a controller such as, for example, the SDN controller 120 described with respect to FIG. 1. The physical network 205 can include a wireless node 225. The physical network 205 can link to a wide-area network 105 such as the Internet. The physical network can include both in-band links of the data plane network 210 (solid lines) and OOB links of the backup, OOB control plane network 220 (dashed lines). In some implementations, the in-band links can include wired connections such as Ethernet or optical fiber connections. In some implementations, the OOB links can be wired or optical connections physically distinct form the connections of the data plane network 210. In some implementations, the physical network 205 can include a wireless node 225. The wireless node 225 can communicate with the network devices via the OOB links. In some implementations, the OOB links can include wireless links to and from the wireless node 225 such as, without limitation, WiFi, 3G, LTE, or satellite communications.

The data plane network 210 can represent the fabric of the network through which data is transmitted to and from users and hosts. Control packets traversing the data plane network 210 are said to be in the in-band CPN.

The logical in-band CPN 215 can represent the connections of the in-band control plane. The logical in-band CPN 215 shares the physical links and nodes of the data plane network 210. The logical in-band CPN 215 does not need to use every link of the data plane network 210. Instead, each node only needs one active route for reaching the controller 120. In some implementations, the network topology of the logical in-band CPN 215 can be a directed acyclic graph (DAG). In this context, a DAG is a network configuration in which each node has a path to the controller 120 via one or more directional links, such that there is no way to start at any node and follow a consistently-directed sequence of links that eventually loops back to that node again. Arranging the logical in-band CPN 215 in this manner can provide advantages as described below.

The logical OOB CPN 220 can represent the connections of the OOB CPN. In the event the network becomes partitioned, preventing one or more of the network devices 120 from reaching the controller 120 via links of the in-band CPN 215, one or more of the network devices can attempt to fall back to the logical OOB CPN 220. The network devices can attempt to reach the controller 120 via one of the OOB links, represented by dashed lines. It is not necessary for every network device to have a dedicated, direct OOB link to the controller 120. Presumably, even in the event of a partition, many of the in-band links will still be functional. Therefore, as long as each network device 130 has an open connection to another network device 130 with an OOB link to the controller 120, each network device will be able to notify the controller 120 of the partition. In some implementations, the OOB links can have a lower bandwidth or higher latency than the in-band links. In some implementations, the OOB links can include wireless data connections.

Figure 3:
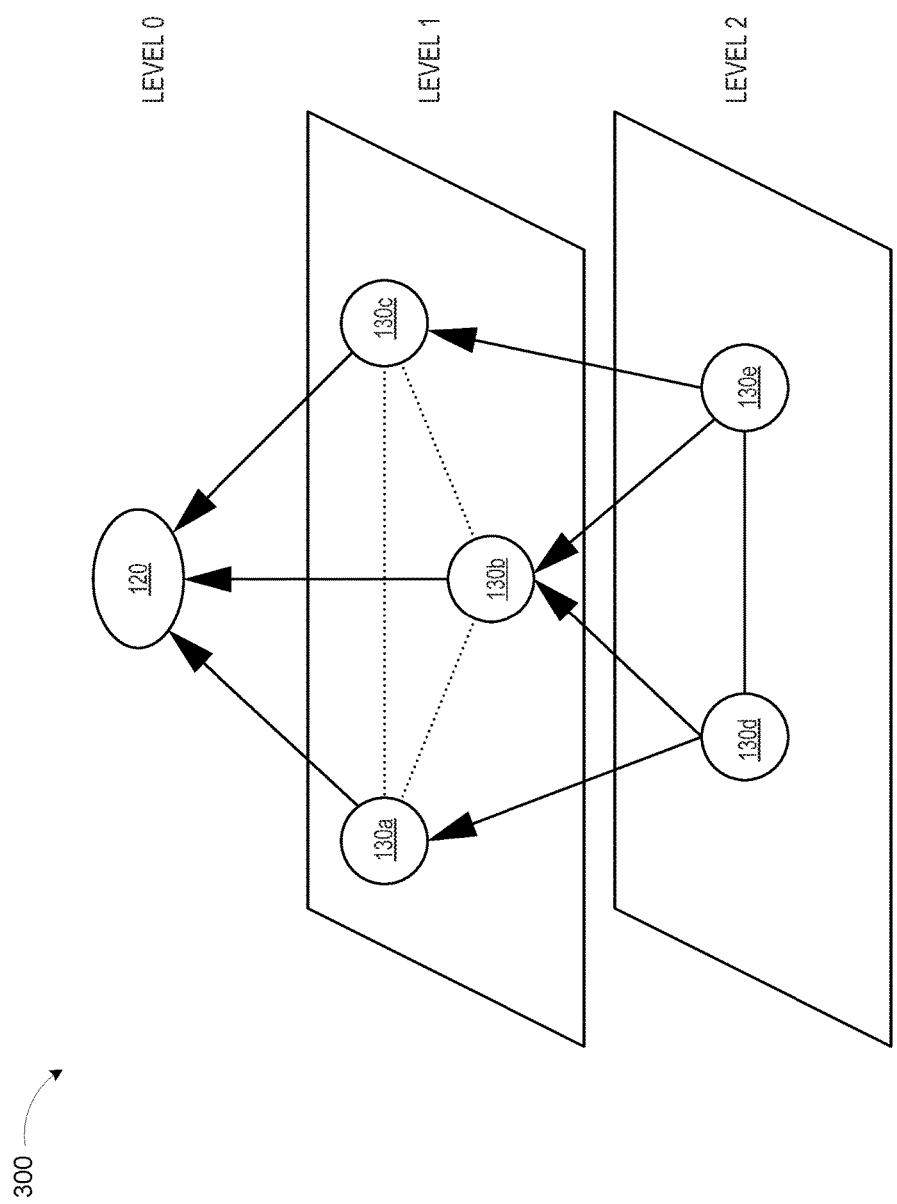
FIG. 3 is an example representation of a network having a directed acyclic graph topology, according to an illustrative implementation.

FIG. 3 is an example representation of a network 300 having a directed acyclic graph (DAG) topology. FIG. 3 shows Levels 0 through 2 of a DAG network topology. In some implementations, the network 300 can have more or fewer levels. Level 0 of the network includes the SDN controller 120. Level 1 of the network includes the network devices 130a, 130b, and 130c. Level 2 of the network includes the network devices 130d and 130e. The SDN controller 120 and the network devices 130a-130e for a DAG network topology; i.e., each network device 130 has a path to the controller 120 via one or more directional links, such that there is no way to start at any node and follow a consistently-directed sequence of links that eventually loops back to that node again.

Directionality in a DAG is an construct used to establish a direction to and from the SDN controller 120 for each network device 130. Each link is actually a bi-directional link, but is assigned a direction label for the purpose of creating the DAG. A network device 130 will send and receive control packets to and from an SDN controller 120 via a link said to be "controller-directed" with respect to the network device 130. A controller-directed link is denoted with arrow pointing away from the network device 130. The network device 130 will send and receive control packets to and from higher level nodes via a link said to be "outward-directed" with respect to the network device 130. An outward-directed link is denoted with an arrow pointing towards the network device 130. Directionality of a link is expressed with respect to a particular network device 130. For example, the link between the network device 130a and 130d is an outward-directed link with respect to the network device 130a, and a controller-directed link with respect to the network device 130d. The network 300 described in FIG. 3 can illustrate this convention.

In the network 300, the network device 130a has a controller-directed link to the SDN controller 120. Because the network device 130a is linked directly to the SDN controller 120 via a single-hop connection, the network device 130a can be categorized as residing in Level 1. The network device 130a also has an outward-directed link to the network device 130d. This link is controller-directed with respect to the network device 130d. The network device 130d resides in Level 2, because it is two hops removed to the SDN controller 120 via either the network device 130a or the network device 130b. In applying the algorithm used to create the DAG topology, the network devices 130 can assign a direction label to each link incorporated into the DAG.

Constructing a directed acyclic graph (DAG) rooted at the SDN controller 120 can be accomplished as follows. The network controller 120 is at Level 0 of the network, and will be the only node which has no controller-directed links; rather, it will have outward-directed links to the neighboring network devices 130a, 130b, and 130c. The neighboring network devices 130a, 130b, and 130c are in the first level of the network, Level 1. Each network device 130 in Level 1 has at least one controller-directed link towards the SDN controller 120. As previously described, each link between the network devices 130 and the SDN controller 120 are bidirectional, but are merely assigned a direction label for the purpose of creating the DAG.

Level 2 of the network includes the network devices 130d and 130e, which neighbor the network devices 130a, 130b, and 130c. Each network device 130 in Level 2 has at least one controller-directed link to a network device 130 in the next lower level. In this case, the network device 130d has controller-directed links to the network devices 130a and 130b, respectively, and the network device 130e has controller-directed links to the network devices 130b and 130c. Note, however, that obeying the directionality assigned to each link of the network topology 300, there is no possible route by which one can return to any individual network device 130. Accordingly, the network topology 300 obeys the principals of a DAG.

For each Level i, the minimum hop count from each network device 130 of Level i to the SDN controller 120 is i. Within each Level i, there may be one or more DAGs. For any node on Level i, the node can use three categories of links:
1. Links to Level i-1 (representing the shortest path to the SDN controller 120).
2. Links to other nodes on the same level (Level i).
3. Links to nodes on Level i+1 (least preferred).

For control packet traffic from the network devices 130 to the SDN controller, the network devices 130 can obey the following rules:

a. For packets from other nodes, transmit the packets to the SDN controller 120 via only Category 1 links.
b. For packets originating at the node: prefer Category 1 links, and if the Category 1 links are overloaded, transmit the packets to the SDN controller 120 via Category 2 links.

The SDN controller 120 can transmit control packet traffic to the network devices 130 via links that are outward-directed with respect to the SDN controller 120. Each network device 130 will receive the control packet traffic from the SDN controller 120 (and perhaps one or more intermediary nodes) via a link that is controller-directed with respect to the network device 130, and transmit the control packet traffic to higher level nodes via links that are outward-directed with respect to the network device 130. Thus, if the SDN controller 120 sends a control packet, the control packet will first go to the nodes of Level 1, then the nodes Level 2, and so on. This is simply forwarding packets along the opposite assigned direction of each link in the DAG.

In some implementations, the network can employ packet duplication and deduplication. For example, each network device 130 can duplicate each received control packet, and send a duplicate to each Level i+1 network device 130 neighbors. If a network device 130 receives duplicated control packets from more than one Level i-1 neighbor, the receiving network device 130 can deduplicate the control packet. Thus, the overhead can be capped at the number of interlevel links. The benefits of duplication and deduplication can be significant for highly dynamic networks, where a path becoming unavailable can cause unique packets to be dropped. Control packet duplication and deduplication is described in more detail below with respect to FIG. 6.

In some implementations, if an OOB control network is available, network bootstrapping can be accomplished by delivering control packets to nodes via the OOB connections. The bootstrap is similar to how the DAG is initially computed. That is, it starts from the controller and propagates by levels. The nodes closest to controller will be configured first, then the controller uses them to try to reach their neighbors. If the OOB control network is not available, there is no publicly known in-band bootstrap. Thus, if the controller cannot establish a link to a node via the OOB control network, the controller cannot configure that node.

Figure 4:
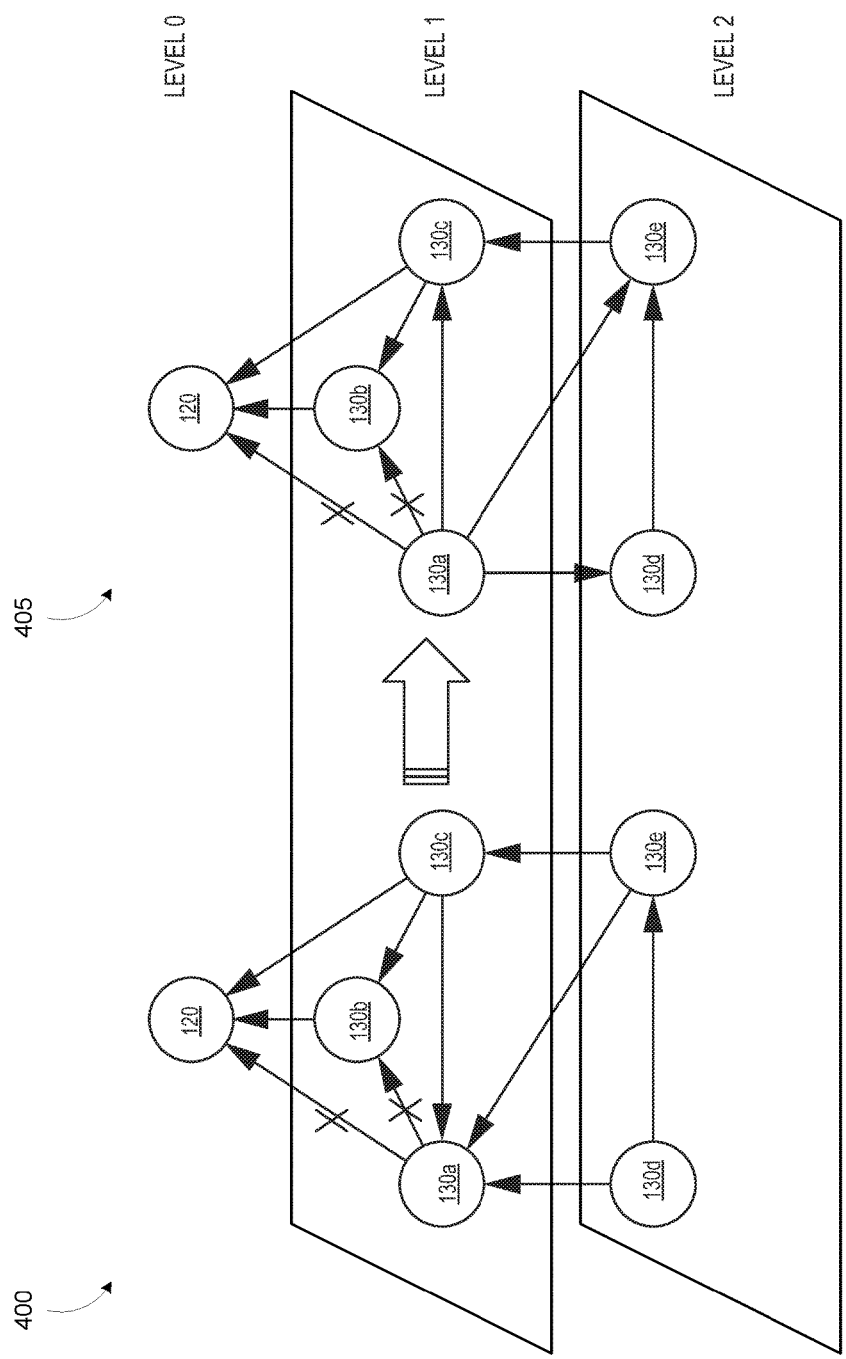
FIG. 4 is an example representation of a network having a directed acyclic graph topology experiencing link failures, according to an illustrative implementation.

FIG. 4 is an example representation of a network 400 having a directed acyclic graph topology experiencing link failures, according to an illustrative implementation. FIG. 4 shows Levels 0 through 2 of a DAG network topology. In some implementations, the network 300 can have more or fewer levels. Level 0 of the network includes the SDN controller 120. Level 1 of the network includes the network devices 130a, 130b, and 130c. Level 2 of the network includes the network devices 130d and 130e. The links of the network are arranged as a DAG.

The network device 130a has two controller-directed links: one to the network device 130a and one to the SDN controller 120. Because the network device 130a is linked directly to the SDN controller 120 via one of its controller-directed links (that is, by a one-hop connection), the network device 130a can be categorized as residing in Level 1, even though it also has a two-hop connection to the SDN controller 120 via the network device 130b. The network device 130a also has three outward-directed links to the network devices 130c, 130d, and 130e, respectively. Each of these three links is controller-directed with respect to the network devices 130c, 130d, and 130e, respectively. The network devices 130d and 130e reside in Level 2, due to the two-hop connection to the SDN controller 120.

Network links can occasionally fail or otherwise become unusable. In this example, the two controller-directed links of the network device 130a have failed. The failed links in FIG. 4 are denoted with an X. The network devices 130 and the SDN controller 120 can detect link failures by several mechanisms. In some implementations, the network devices 130 and the SDN controller 120 can monitor a physical layer signal strength. Monitoring the physical layer signal strength can detect failures such as a failed interface or a severed optical fiber or wire. In some implementations, the network devices 130 and the SDN controller 120 can monitor keep-alive messages sent between respective ends of a link. Monitoring keep-alive messages can detect higher network level failures such as a misconfigured interface.

The network can handle failures with dynamic topology changes. If a network node such as the network device 130a loses one of its controller-directed links, no network changes should be necessary because the network device 130a should still have one remaining functional link to the SDN controller 120. However, in the event that all of the network device's 130a controller-directed links fail, as shown by the Xs in the example network 400, the network device 130a can reverse one or more of its outward-directed links such that they become controller-directed. In the example network 405, the network device 130a has reversed all of its outward-directed links; that is, the network device 130a has reversed the links going to the network devices 130c, 130d, and 130e respectively. Those links are now controller-directed with respect to the network device 130a. In the example network 405, the network device 130a is connected to the SDN controller via the network device 130c (and also via the network devices 130d and 130e).

When a network device 130 in Level i loses all of its controller-directed links, it can notify all of its neighbors that it is now in a higher level, such as Level i+1 or Level i+2. In particular, the network device 130a can notify its neighbors that it is in Level i+1 to the extent that it can reach the SDN controller 120 via a network device in Level i. Or, in the event that the network device 130a can reach the SDN controller 120 via a network device in Level i+1, it can notify its neighbors that it now resides in Level i+2. This notification, and its receipt by the neighboring network devices, can cause the network devices 130 to agree to reverse the connecting links. Thus the outward-directed links from the network device 130a to the network devices 130c, 130d, and 130e, respectively, are now reversed such that they are controller directed with respect to the network device 130a. The reversal process may propagate to a set of network devices 130 until it converges in a new DAG where each network device 130 has a viable path to reach the SDN controller 120.

One advantageous property of this reversal process is that the scope of link reversals is limited only to those network devices who lost their viable connection to the SDN controller 120. Any network device 130 that still has at least one directed path to the SDN controller 120 should not be affected. Likewise, increasing the level index number can be accomplished by each network device 130 without involving the SDN controller 120. Link reversal need only be agreed upon between direct neighbors, and need not propagate to every node. That is, the process of re-establishing the DAG does not require global consensus.

Figure 5A:
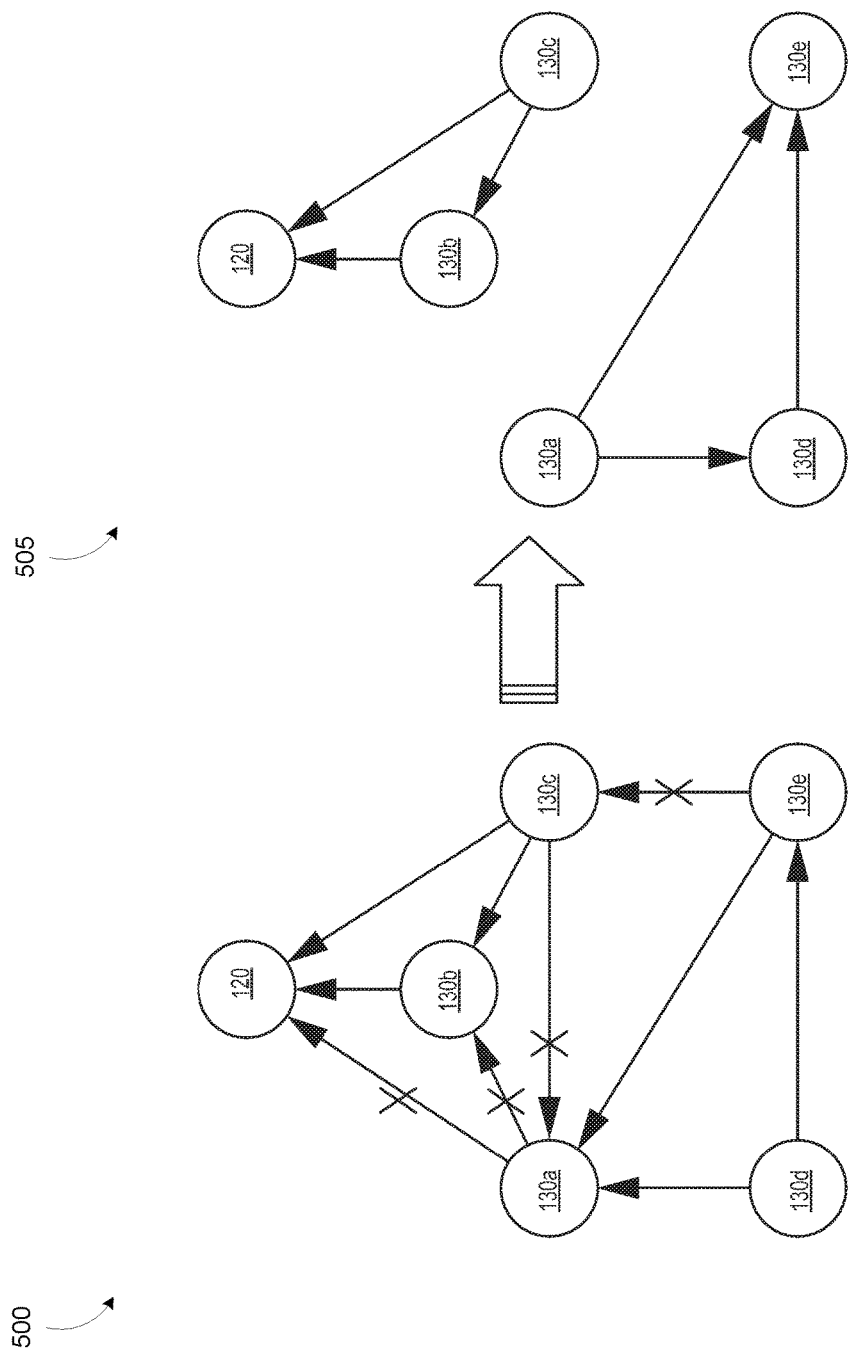
FIGS. 5A and 5B illustrate example representations of a network having a directed acyclic graph topology and experiencing link failures leading to a network partition, according to an illustrative implementation.
Figure 5B:
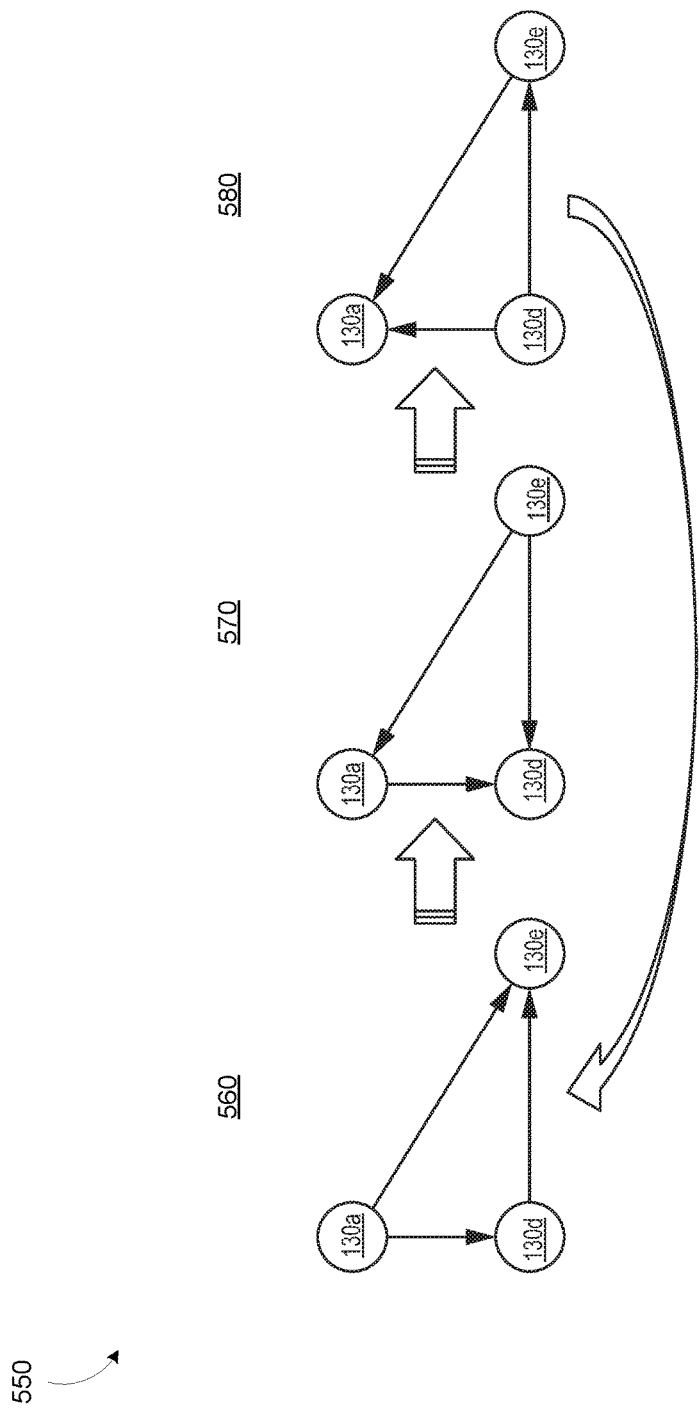

FIGS. 5A and 5B show example representations of a network 500 having a directed acyclic graph topology and experiencing link failures leading to a network partition, according to an illustrative implementation. The example network 500 is similar in topology to that of the example network 400. The example network 500, however, has experienced two additional link failures as shown by the Xs on the links from the network device 130c to the network devices 130a and 130e, respectively. Thus, showing only the viable links, the network now has the layout as shown in the example network 505. The network 505 is partitioned. A first partition includes the network devices 130a, 130d, and 130e. A second partition includes the SDN controller 120 and the network devices 130b and 130c. The first partition and second partition have no viable links between them. Accordingly, the network devices 130a, 130d, and 130e are disconnected from the SDN controller 120.

In the event of a network partition such as this, the network devices 130 may continue attempting to reverse links in vain attempts to reach the SDN controller 120. This can lead to infinite reversals. FIG. 5B shows the network partition 550, with the partitioned network devices 130a, 130d, and 130e going through the process of infinite reversals. The reversals take place in three stages 560, 570, and 580 repeating infinitely.

At stage 560, the network device 130e has no controller-directed links, and thus has no viable link to the SDN controller 120. Accordingly, the network device 130e will reverse its outward-directed links to controller-directed in an attempt to reach the SDN controller 120. Thus, moving from stage 560 to stage 570, the two outward-directed links of the network device 130e reverse to become the controller-directed links shown in the configuration at stage 570. The link between the network device 130a and the network device 130d does not change at this time.

At stage 570, because of the reversal of links by the network device 130e, the network device 130d now has no controller-directed links. Accordingly, the network device 130d will reverse its outward-directed links to controller-directed in an attempt to reach the SDN controller 120. Thus, moving from stage 570 to stage 580, the two outward-directed links of the network device 130d reverse to become the controller-directed links shown in the configuration at stage 570. The link between the network device 130a and the network device 130e does not change at this time.

At stage 580, because of the reversal of links by the network device 130d, the network device 130a now has no controller-directed links. Accordingly, the network device 130a will reverse its outward-directed links to controller-directed in an attempt to reach the SDN controller 120. Thus, moving from stage 580 back to stage 560, the two outward-directed links of the network device 130a reverse to become the controller-directed links shown in the configuration at stage 560. The link between the network device 130d and the network device 130e does not change at this time. This process can cycle through the stages 560, 570, and 580 endlessly unless interrupted.

Accordingly, partition detection can be accomplished by a network device 130 counting a number reversals of individual links, or the total number of reversals of all its links. If the network device 130 counts a predetermined number of reversals without receiving any messages from the SDN controller 120, the network device 130 can determine that the network is partitioned. In some implementations, the predetermined number of reversals can correspond to or be a function of the maximum level number allowed for the network, where the maximum level number corresponds to the minimum number of hops between the controller and the most distant node. For example, if the maximum level number allowed for the network is n, the network devices 130 can determine that the network is partitioned if it detects n, n+1, n*2, or any other suitable number of reversals corresponding to or calculated as a function of the maximum level number without receiving a communication from the SDN controller 120. In some implementations, in addition or in the alternative to detecting a partition based on a number of detected link reversals, the network device 130 can determine that the in-band control plane network is partitioned by determining that the network device 130 has no remaining controller-directed links. If the network device 130 cannot create a controller-directed link, than the network device 130 is isolated from the SDN controller 120, and the network is partitioned. In some implementations, in addition or in the alternative to either or both of the aforementioned partition detection techniques, the network device 130 can determine that the in-band control plane network is partitioned by determining that all possible controller-directed links of the network device 130 have been reversed by the respective neighboring network device 130. If every controller-directed link of the network device 130 is reversed without the network device 130 successfully receiving a communication from the SDN controller 120, the network may be partitioned. In the event that the network device 130 determines that the network is partitioned, it can search for an available fallback connection to an out-of-band control plane network, such as a wireless, cellular, or satellite connection.

Figure 6:
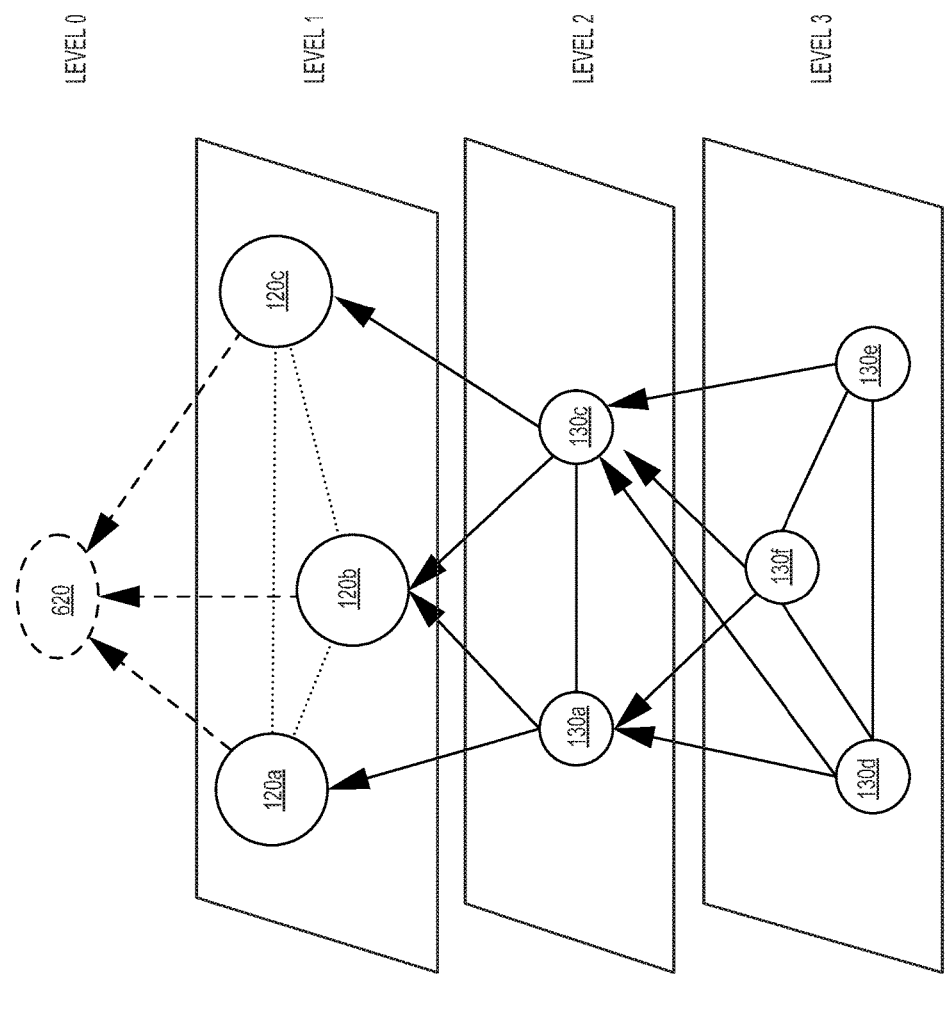
FIG. 6 is an example representation of a network having a directed acyclic graph network topology including multiple controllers, according to an illustrative implementation.

FIG. 6 is an example representation of a network 600 having a directed acyclic graph network topology including multiple controllers, according to an illustrative implementation. The network 600 differs from the network 300, 400, and 500 in that it can have multiple software-defined network (SDN) controllers 120a, 120b, and 120c. The SDN controllers 120 allow the network to avoid single points of failure. The SDN controllers 120 may be geographically distributed to further improve resilience against disasters.

The principal of operation creating and maintaining the DAG is the same as with single SDN controller networks, but with the introduction of a virtual root. The network arranges itself into a DAG by creating a virtual controller 620 in Level 0. The SDN controllers 120 make up Level 1 of the network. Each network device 130 of the network, in Level 2 and above, treats the SDN controllers 120 as Level 1 nodes.

The network 600 has several network devices 130 having multiple controller-directed links. The multiple controller-directed links allows for redundancy in the distribution of control packets through the in-band control plane network (CPN). Redundancy is accomplished through duplication and deduplication of control packets. Each network device 130 can duplicate each received control packet, and send a duplicate to each Level i+1 network device 130 neighbors. If a network device 130 receives duplicated control packets from more than one Level i−1 neighbor, the receiving network device 130 can deduplicate the control packet. Thus, the overhead in redundant control packet traffic can be capped at the number of interlevel links.

For example, the SDN controller 120b can send duplicate control packets to the network devices 130a and 130c, respectively. The network device 130a can receive two control packets from the SDN controllers 120a and 120b, respectively. The network device 130c can receive two control packets from the SDN controllers 120b and 120c, respectively. Thus, if any of the links between the network devices 130a and 130b in Level 2, and the SDN controllers 120a, 120b, and 120c of Level 1 fail, the network devices 130a and 130b can still receive the control packet. The network devices 130a and 130c can then deduplicate the control packet. The network device 130a can duplicate the control packet again, and send it to the network devices 130d and 130f in Level 3, and so on. The benefits of duplication and deduplication can significant for highly dynamic networks, where a path becoming unavailable will cause unique packets to be dropped.

With the foregoing background, a description of a system for hybrid control of a computer network can be undertaken.

The system for hybrid control of a computer network can include a controller and a plurality of nodes. The controller can be of any suitable type including the SDN controller 120 described above with respect to FIG. 1. The plurality of nodes can include network devices 130, such as described above with respect to FIG. 1. The plurality of nodes can have an in-band CPN, such as the logical in-band CPN 215 described above with respect to FIG. 2. The in-band CPN can be arranged in a DAG routing topology, similar to the networks 300, 400, 500, and 600 described previously. Each node can have at least one link that is controller-directed such that the node can communicate with the controller via the in-band control plane network. At least one node of the system is configured to perform operations for detecting a link failure, reversing a link from outward-directed to controller-directed, detecting a re-reversal of the link as initiated by a second node, determine that the network is partitioned based on detecting a predetermined number of link reversals without receiving a communication from the controller, and transmitting data indicating that the in-band CPN is partitioned to the controller via an OOB CPN.

In some implementations, the out-of-band control plane network can be a wireless network. The wireless network can carry the OOB CPN. In the event of a partition, the nodes can fallback to using OOB CPN. The wireless network can include one or more of a WiFi network, a mobile data network, or a satellite data link. In some implementations, the wireless network can include an aerial node. The aerial node can be a switch or an access point on an aerial vehicle such as a manned or autonomous winged aircraft, helicopter, or lighter-than-air vehicle. In some implementations, the wireless network can include a satellite-based node. The wireless network may be more costly to build and maintain than a wire or optical network carrying the data plane network and the in-band CPN. The wireless network may have lower bandwidth and exhibit higher latency than the wire or optical network. Furthermore, the wireless network may not be capable of carrying the full load of the CPN. The wireless network can, however, serve as an adequate backup OOB CPN in the event the primary in-band CPN experiences a failure or partition. Because the wireless network need not be built or maintained to handle 100% of the CPN load 100% of the time, the cost can be greatly reduced relative to a wireless network with a dedicated CPN.

In some implementations, the computer network can include a plurality of hosts having addresses in a first address space, and a plurality of network devices having addresses in a second address space separate from the first address space. The network devices 130 need not distinguish between control and data traffic in the data plane network/ in-band CPN. All rules are applied based on the destination address of the traffic; for example, the IP address. To distinguish traffic, however, the address space of the computer network can be divided. A first address space of the computer network can be assigned to hosts, and a second address space of the computer network can be assigned to network devices 130. In this manner, rules specific to traffic destined for hosts or network devices, respectively, can be applied based on address masks.

In some implementations, each flow entry can carry a priority in it, and the nodes can enforce the priority when queuing packets. In some implementations, data plane communication can include transmitting data packets having a first priority, and data plane communications can include transmitting control packets having a second priority different from the first priority. In some implementations, the control packets may contain data critical for the proper function of the network. In such cases, the second priority can be higher than the first priority. In some implementations, the data packets may contain latency-sensitive traffic such as streaming video or VoIP. In such cases, the first priority can be higher than the second priority in order to maintain the necessary quality of service for the data traffic.

Figure 7:
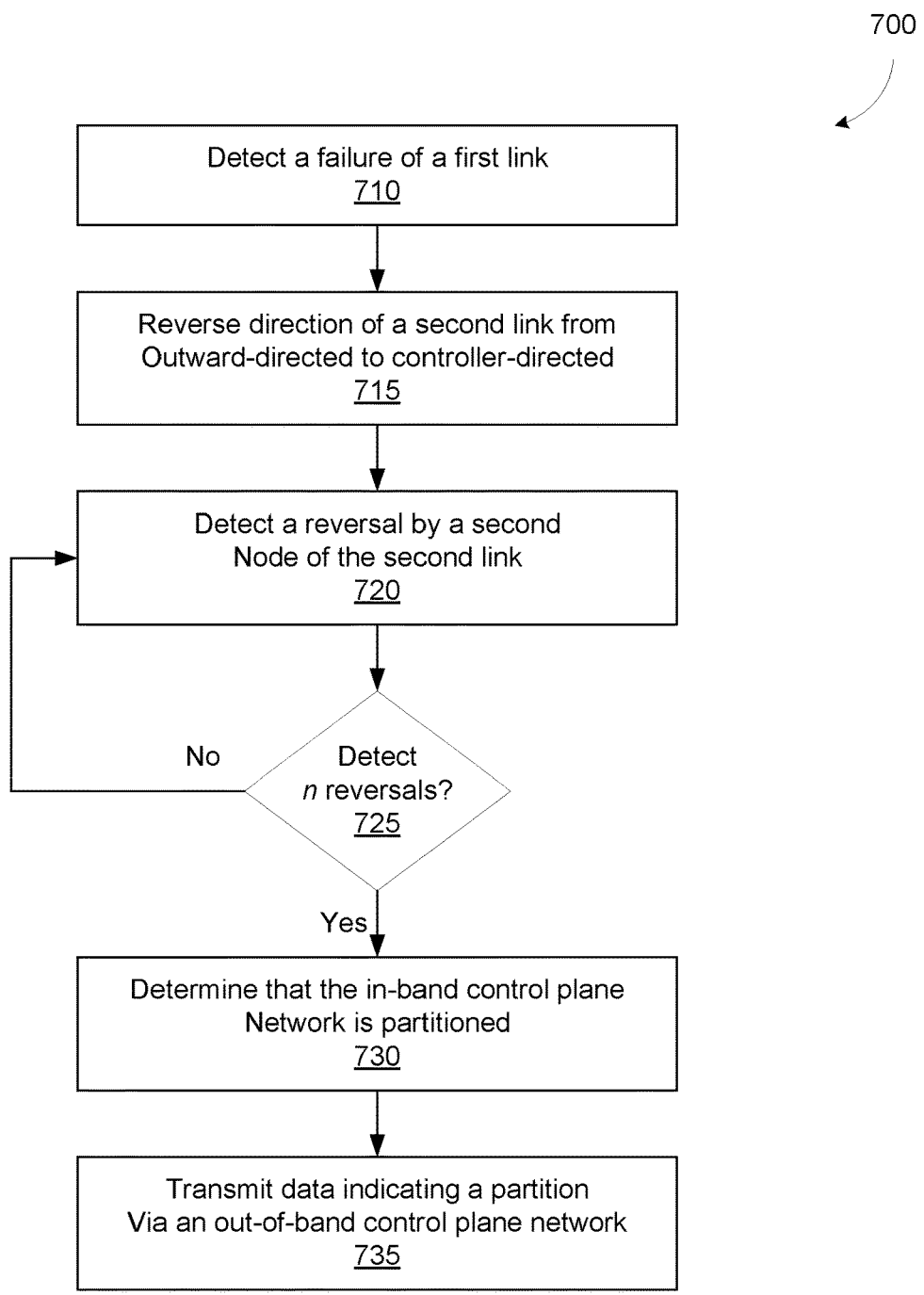
FIG. 7 is flowchart of an example method of hybrid control of computer networks, according to an illustrative implementation.

FIG. 7 is flowchart of an example method 700 of hybrid control of computer networks, according to an illustrative implementation. The method 700 is performed by a first node, such as a network device 130, of a plurality of nodes having an in-band control plane network (CPN) arranged in a directed acyclic graph (DAG) routing topology. The first node has a first link that is controller-directed such that the first node can communicate with a controller, such as an SDN controller 120, via the in-band CPN. The method 700 includes detecting a failure of the first link (STAGE 710). The method 700 includes reversing a second link from outward-directed to controller-directed (STAGE 715). The method 700 includes detecting a reversal by a second node of the second link (STAGE 720). The method 700 includes determining whether a predetermined number of reversals has been detected (decision block 725). The method 700 includes determining, upon counting a predetermined number of reversals without receiving a communication from the controller, that the in-band CPN is partitioned (STAGE 730). The method 700 includes transmitting data indicating that the network is partition via an out-of-band (OOB) CPN (STAGE 735).

The method 700 includes detecting a failure of the first link (STAGE 710). The control module 144 of the network device 130 can detect a link failure of the first link of the network device 130, where the first link was controller-directed. The network device 130 can detect the link failure by several mechanisms. In some implementations, a network interface 180 of the network device 130 can monitor a physical layer signal strength, where a low or absent signal strength can indicate a failed interface, or a severed wire or optical fiber. In some implementations, the network interface 180 and a control module 144, of the network device 130 can monitor keep-alive messages received from the SDN controller 120 and other linked nodes. By monitoring the keep-alive messages, the control module 144 can detect higher network level failures such as a misconfigured interface on the SDN controller 120 or a neighboring node.

The method 700 includes reversing a second link from outward-directed to controller-directed (STAGE 715). The network device 130 can, responsive to detecting the link failure of the first link at the first network interface 180, reverse a second link from a second network interface 180 to a second node from outward-directed to controller-directed. The control module 144 can update the memory 136 with the new direction assignment. The network device 130 will then be able to communicate with the SDN controller 120 via the second link, now controller-directed, and the in-band control network. In this manner, the in-band CPN can continue to operate despite the link failure. The network device 130 can further notify the SDN controller 120 of the link failure. A control module 142 of the SDN controller 120 can update a memory 148 of the SDN controller 120 with routing information that takes into account the link failure. The SDN controller 120 can contact the second node on the other side of the failed link and attempt to repair the link. The SDN controller 120 can send a notification regarding the link failure to a system administrator.

The method 700 includes detecting a reversal by a second node of the second link (STAGE 720). The control module 144 of the network device 130 can detect a reversal by the second node of the second link at the second network interface 180. If the control module 144 detects the reversal, the network device 130 can attempt to communicate the SDN controller 120 via another controller-directed link. The network device 130 may need to reverse another outward-directed link at a third network interface 180.

The method 700 includes determining whether a predetermined number of reversals has been detected (decision block 725). The control module 144 can determine whether a predetermined number of reversals of the second link have occurred without receiving a communication from the SDN controller 120. If the network device 130 is able to communicate with the SDN controller 120, the network device 130 can continue sending and receiving control packets. However, if the control module 144 counts a predetermined number n reversals without successfully communicating with the SDN controller 120, it can determine that the network is partitioned.

The method 700 includes determining that the in-band CPN is partitioned (STAGE 730). The control module 144 can determine, based on detecting a predetermined number of reversals of the second link without receiving a communication from the SDN controller 120, that the in-band control plane network is partitioned. If the network device 130 determines that the in-band CPN is partitioned in a manner that prevents the network device 130 from communicating with the SDN controller 120, the network device 130 can attempt to communicate with the SDN controller 120 via a backup connection. Accordingly, the network device 130 can attempt to open a connection to the SDN controller 120 using a network interface 180 connected to a link in an OOB CPN. The OOB CPN can include any of the wired or wireless networks described previously. In some implementations, there may be a single backup network connection available to be tapped as an OOB CPN. In some implementations, there may be multiple backup network connections available. The network device 130 can fall back to whatever backup network connection is available to contact the SDN controller 120.

The method 700 includes transmitting data indicating that the network is partition via an OOB CPN (STAGE 735). The method 700 includes transmitting data indicating a partition to the SDN controller 120 via the network interface 180 connected to the link in the OOB CPN. In some implementations, the SDN controller 120 can then attempt to repair the partition by resetting one or more network interfaces 180 or one or more network devices 130. In some implementations, the SDN controller 120 can alert a system administrator to the partition, and direct the system administrator to locations where physical repair, modification, or replacement may be necessary.

Figure 8:
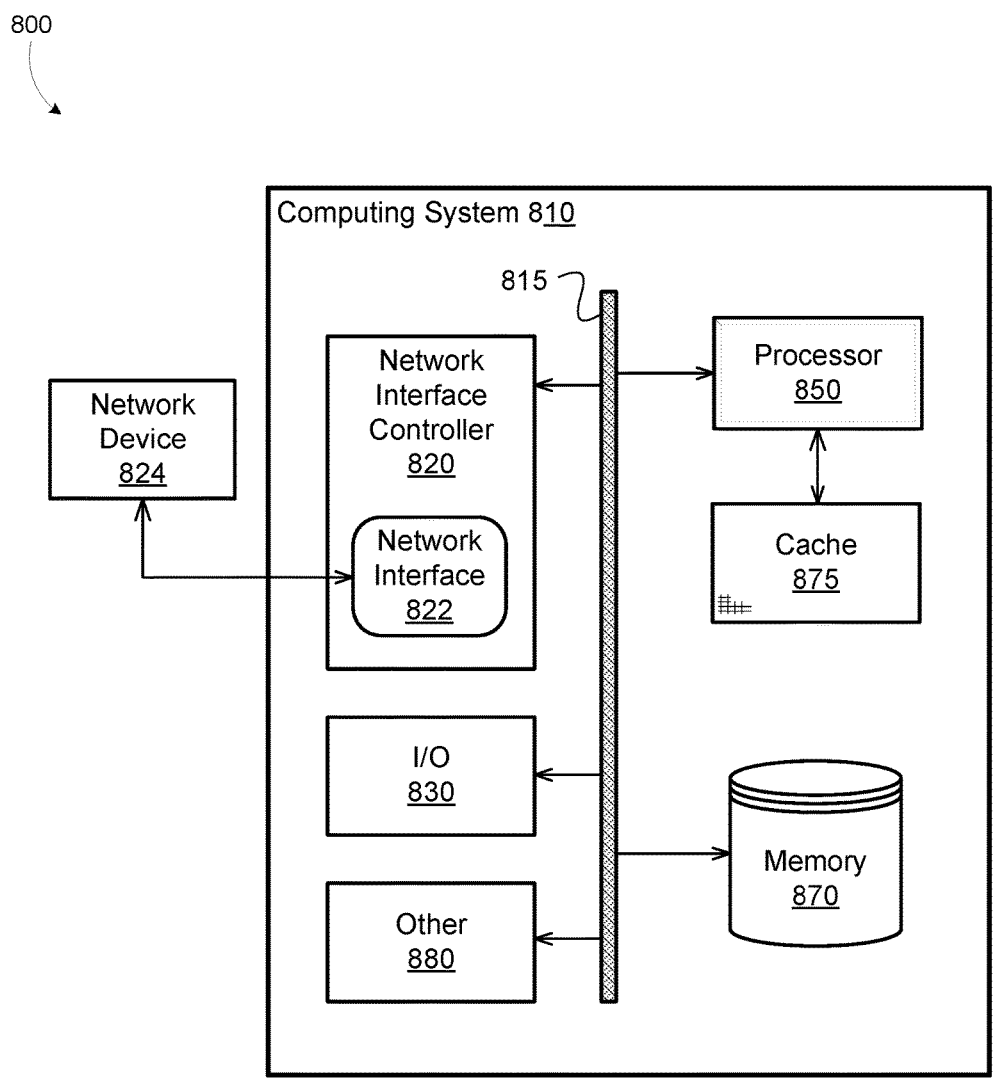
FIG. 8 is a block diagram illustrating a general architecture for a computer system that may be employed to implement elements of the systems and methods described and illustrated herein, according to an illustrative implementation.

FIG. 8 is a block diagram illustrating a general architecture for a computer system 800 that may be employed to implement elements of the systems and methods described and illustrated herein, according to an illustrative implementation. The computing system 800 may be utilized in implementing the hybrid control of computer networks method 700 shown in FIG. 7.

In broad overview, the computing system 810 includes at least one processor 850 for performing actions in accordance with instructions and one or more memory devices 870 or 875 for storing instructions and data. The illustrated example computing system 810 includes one or more processors 850 in communication, via a bus 815, with at least one network interface controller 820 with one or more network interface ports 822 connecting to one or more network devices 824, memory 870, and any other devices 880, e.g., an I/O interface. Generally, a processor 850 will execute instructions received from memory. The processor 850 illustrated incorporates, or is directly connected to, cache memory 875.

In more detail, the processor 850 may be any logic circuitry that processes instructions, e.g., instructions fetched from the memory 870 or cache 875. In many embodiments, the processor 850 is a microprocessor unit or special purpose processor. The computing device 800 may be based on any processor, or set of processors, capable of operating as described herein. In some implementations, the processor 850 can be capable of executing the hybrid control of computer networks method 700 shown in FIG. 7. The processor 850 may be a single core or multi-core processor. The processor 850 may be multiple processors. In some implementations, the processor 850 can be configured to run multi-threaded operations. In some implementations, the processor 850 may host one or more virtual machines or containers, along with a hypervisor or container manager for managing the operation of the virtual machines or containers. In such implementations, the method 700 shown in FIG. 7 can be implemented within the virtualized or containerized environments provided on the processor 850.

The memory 870 may be any device suitable for storing computer readable data. The memory 870 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 800 may have any number of memory devices 870. In some implementations, the memory 870 can include instructions corresponding to the hybrid control of computer networks method 700 shown in FIG. 7. In some implementations, the memory 870 supports virtualized or containerized memory accessible by virtual machine or container execution environments provided by the computing system 810.

The cache memory 875 is generally a form of computer memory placed in close proximity to the processor 850 for fast read times. In some implementations, the cache memory 875 is part of, or on the same chip as, the processor 850. In some implementations, there are multiple levels of cache 875, e.g., L2 and L3 cache layers.

The network interface controller 820 manages data exchanges via the network interfaces 822 (also referred to as network interface ports). The network interface controller 820 handles the physical and data link layers of the OSI model for network communication. In some implementations, some of the network interface controller's tasks are handled by the processor 850. In some implementations, the network interface controller 820 is part of the processor 850. In some implementations, a computing system 810 has multiple network interface controllers 820. The network interfaces 822 are connection points for physical network links. In some implementations, the network interface controller 820 supports wireless network connections and an interface port 822 is a wireless receiver/transmitter. Generally, a computing device 810 exchanges data with other network devices 824 via physical or wireless links to a network interfaces 822. In some implementations, the network interface controller 820 implements a network protocol such as Ethernet.

The other network devices 824 are connected to the computing device 810 via a network interface port 822. The other network devices 824 may be peer computing devices, network devices, or any other computing device with network functionality. For example, a first network device 824 may be a network device such as a hub, a bridge, a switch, or a router, connecting the computing device 810 to a data network such as the Internet.

The other devices 880 may include an I/O interface, external serial device ports, and any additional co-processors. For example, a computing system 810 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 800 includes an additional device 880 such as a coprocessor, e.g., a math co-processor can assist the processor 850 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A system for hybrid control of a computer network, comprising:
a first node of a plurality of nodes having an in-band control plane network arranged in a directed acyclic graph routing topology, the first node having a first link that is controller-directed such that the first node can communicate with a controller via the in-band control plane network, wherein the first node is configured to:
detect a link failure of the first link of the first node, the first link being controller-directed;
reverse, in response to detecting the link failure of the first link, a second link to a second node from outward-directed to controller-directed such that the first node can communicate with the controller via the second link and the in-band control plane network;
detect a reversal by the second node of the second link;
determine, responsive to detecting a predetermined number of reversals of the second link without receiving a communication from the controller, the predetermined number being greater than 1, that there are no more in-band links between the first node and the controller and that the in-band control plane network is therefore partitioned; and
transmit, to the controller via an out-of-band control plane network, data indicating that the in-band control plane network is partitioned.

2. The system of claim 1, wherein the out-of-band control plane network comprises a wireless network.

3. The system of claim 1, wherein the predetermined number of reversals equals a maximum allowed level value.

4. The system of claim 1, wherein determining that the in-band control plane network is partitioned comprises determining that the first node has no remaining controller-directed links or that all possible controller-directed links of the first node have been reversed.

5. The system of claim 1, wherein the first node has a third outward-directed link to a third node and a fourth outward-directed link to a fourth node, and the first node is further configured to:
receive, from the controller via the first link, a control packet;
duplicate the control packet; and
transmit the duplicated control packets to the third node via the third outward-directed link and to the fourth node via the fourth outward-directed link, respectively.

6. The system of claim 5, further comprising a fifth node receiving the duplicated control packets from the third node and the fourth node, respectively, wherein:
the fifth node deduplicates the duplicated control packets; and
transmits the deduplicated control packet via a fifth outward-directed link to a sixth node.

7. The system of claim 1, comprising:
a plurality of controllers, wherein the directed acyclic graph routing topology includes a virtual root having a virtual outward-directed link to each of the plurality of controllers.

8. The system of claim 1, wherein the computer network comprises a plurality of hosts having addresses in a first address space, and the nodes have addresses in a second address space separate from the first address space.

9. A method of hybrid control of a computer network, comprising:
for a computer network having a first node of a plurality of nodes having an in-band control plane network arranged in a directed acyclic graph routing topology, the first node having a first link that is controller-directed such that the first node can communicate with a controller via the in-band control plane network:

detecting, by the first node of the plurality of nodes, a link failure of the first link of the first node, the first link being controller-directed;

reversing, by the first node in response to detecting the link failure of the first link, a second link to a second node from outward-directed to controller-directed such that the first node can communicate with the controller via the second link and the in-band control plane network;

detecting, by the first node, a reversal by the second node of the second link;

determining, responsive to detecting a predetermined number of reversals of the second link without receiving a communication from the controller, the predetermined number being greater than 1, that there are no more in-band links between the first node and the controller and that the in-band control plane network is therefore partitioned; and transmitting, by the first node to the controller via an out-of-band control plane network, data indicating that the in-band control plane network is partitioned.

10. The method of claim 9, wherein the out-of-band control plane network comprises a wireless network.

11. The method of claim 9, wherein the predetermined number of reversals equals a maximum allowed level value.

12. The method of claim 9, wherein determining that the in-band control plane network is partitioned comprises determining that the first node has no remaining controller-directed links or that all possible controller-directed links of the first node have been reversed.

13. The method of claim 9, wherein the first node has a third outward-directed link to a third node and a fourth outward-directed link to a fourth node, the method comprising:

receiving, by the first node from the controller via the first link, a control packet;

duplicating the control packet; and transmitting the duplicated control packets to the third node via the third outward-directed link and to the fourth node via the fourth outward-directed link, respectively.

14. The method of claim 13, comprising:

receiving, by a fifth node, the duplicated control packets from the third node and the fourth node, respectively;

deduplicating, by the fifth node, the duplicated control packets; and transmitting, by the fifth node, the deduplicated control packets via a fifth outward-directed link to a sixth node.

15. The method of claim 9, wherein the network comprises a plurality of controllers, and the directed acyclic graph routing topology includes a virtual root having a virtual outward-directed link to each of the plurality of controllers.

16. The method of claim 9, wherein the computer network comprises a plurality of hosts having addresses in a first address space, and the nodes have addresses in a second address space separate from the first address space.

17. A non-transitory computer-readable medium storing instructions that, when executed by one or more processors of a first node of a plurality of nodes having an in-band control plane network arranged in a directed acyclic graph routing topology, the first node having a first link that is controller-directed such that the first node can communicate with a controller via the in-band control plane network, cause the node to:

detect a link failure of the first link of the first node, the first link being controller-directed;

reverse, in response to detecting the link failure of the first link, a second link to a second node from outward-directed to controller-directed such that the first node can communicate with the controller via the second link and the in-band control plane network;

detect a reversal by the second node of the second link;

determine, responsive to detecting a predetermined number of reversals of the second link without receiving a communication from the controller, the predetermined number being greater than 1, that there are no more in-band links between the first node and the controller and that the in-band control plane network is therefore partitioned; and transmit, to the controller via an out-of-band control plane network, data indicating that the in-band control plane network is partitioned.

18. The computer-readable medium of claim 17, wherein the out-of-band control plane network comprises a wireless network.

19. The computer-readable medium of claim 17, wherein the predetermined number of reversals equals a maximum allowed level value.

20. The computer-readable medium of claim 17, wherein determining that the in-band control plane network is partitioned comprises determining that the first node has no remaining controller-directed links or that all possible controller-directed links of the first node have been reversed.

* * * * *